(12) United States Patent
Frishman et al.

(10) Patent No.: US 11,683,550 B2
(45) Date of Patent: Jun. 20, 2023

(54) APPARATUS, SYSTEM AND METHOD OF VIDEO ENCODING

(71) Applicant: INTEL CORPORATION, Santa Clara, CA (US)

(72) Inventors: Yaniv Frishman, Kiryat Ono (IL); Ran Mor, Herzliya (IL); Sharon Talmor-Marcovici, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 602 days.

(21) Appl. No.: 16/639,843

(22) PCT Filed: Sep. 16, 2018

(86) PCT No.: PCT/US2018/051265
§ 371 (c)(1),
(2) Date: Feb. 18, 2020

(87) PCT Pub. No.: WO2019/055886
PCT Pub. Date: Mar. 21, 2019

(65) Prior Publication Data
US 2022/0345762 A1   Oct. 27, 2022

Related U.S. Application Data

(60) Provisional application No. 62/559,907, filed on Sep. 18, 2017.

(51) Int. Cl.
*H04N 21/41* (2011.01)
*H04N 21/234* (2011.01)
(Continued)

(52) U.S. Cl.
CPC ... *H04N 21/4126* (2013.01); *H04N 21/23439* (2013.01); *H04N 21/2402* (2013.01); *H04N 21/2662* (2013.01)

(58) Field of Classification Search
CPC ......... H04N 21/23439; H04N 21/2402; H04N 21/2662
(Continued)

(56) References Cited

U.S. PATENT DOCUMENTS

| 10,200,732 B1 * | 2/2019 | Montgomery ....... H04N 21/633 |
| 2010/0128777 A1 * | 5/2010 | Garg .................... H04N 19/172 |
| | | 375/E7.026 |

(Continued)

FOREIGN PATENT DOCUMENTS

| CN | 105191329 | 12/2015 |
| CN | 107078852 | 8/2017 |

(Continued)

OTHER PUBLICATIONS

International Preliminary Report on Patentability for International Application No. PCT/US2018/051265, dated Apr. 2, 2020, 8 pages.

(Continued)

*Primary Examiner* — Dominic D Saltarelli
(74) *Attorney, Agent, or Firm* — Shichrur & Co.

(57) ABSTRACT

For example, an apparatus may include a video encoder configured to encode video data into a parallel plurality of encoded video streams, the parallel plurality of encoded video streams including the video data encoded according to a respective plurality of different video bitrates; a selector configured to select, based on one or more parameters corresponding to a condition of a wireless communication link, a selected encoded video stream from the parallel plurality of encoded video streams; and a radio to transmit the selected encoded video stream over the wireless communication link.

23 Claims, 6 Drawing Sheets

(51) Int. Cl.
*H04N 21/24* (2011.01)
*H04N 21/266* (2011.01)
*H04N 21/2343* (2011.01)
*H04N 21/2662* (2011.01)

(58) Field of Classification Search
USPC .................................................. 375/240.01
See application file for complete search history.

(56) References Cited

U.S. PATENT DOCUMENTS

| | | |
|---|---|---|
| 2010/0278230 A1 | 11/2010 | MacInnis et al. |
| 2011/0276710 A1 | 11/2011 | Mighani et al. |
| 2012/0016965 A1* | 1/2012 | Chen ................ H04N 21/23439 709/219 |
| 2013/0290493 A1 | 10/2013 | Oyman et al. |
| 2016/0173875 A1 | 6/2016 | Zhang et al. |
| 2017/0026076 A1* | 1/2017 | Thommana ............ H04K 3/226 |
| 2017/0188054 A1* | 6/2017 | Ma ........................ H04L 67/563 |
| 2018/0324488 A1 | 11/2018 | He et al. |
| 2019/0182520 A1* | 6/2019 | Nihei ................. H04N 21/2402 |

FOREIGN PATENT DOCUMENTS

| | | |
|---|---|---|
| WO | 2016204815 | 12/2016 |
| WO | 2018133734 | 7/2018 |

OTHER PUBLICATIONS

International Search Report and the Written Opinion for International Application No. PCT/US2018/051265, dated Jan. 22, 2019, 16 pages.
Podborski D: "Virtual Reality and Dash", International Broadcasting Conference 2017; Sep. 14, 2017-Sep. 18, 2017; Amsterdam,, No. IBC-2017-18, Sep. 14, 2017, 12 pages.
Emmanuel Thomas et al: "Enhancing MPEG Dash Performance via Server and Network Assistance", IBC 2015 Conference, Sep. 11-15, 2015, Amsterdam, Sep. 11, 2015, 8 pages.
IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF VIDEO ENCODING

CROSS REFERENCE

This application claims the benefit of and priority from U.S. Provisional Patent Application No. 62/559,907 entitled "APPARATUS, SYSTEM AND METHOD OF MULTI BITRATE ENCODING FOR WIRELESS COMMUNICATION", filed Sep. 18, 2017, the entire disclosure of which is incorporated herein by reference.

TECHNICAL FIELD

Aspects described herein generally relate to video encoding.

BACKGROUND

Data, e.g., video data, may be encoded, e.g., by a video encoder. The encoded data may be transmitted by a wireless transmitter.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

Furthermore, reference numerals may be repeated among the figures to indicate corresponding or analogous elements. The figures are listed below.

DETAILED DESCRIPTION

Figure 1:
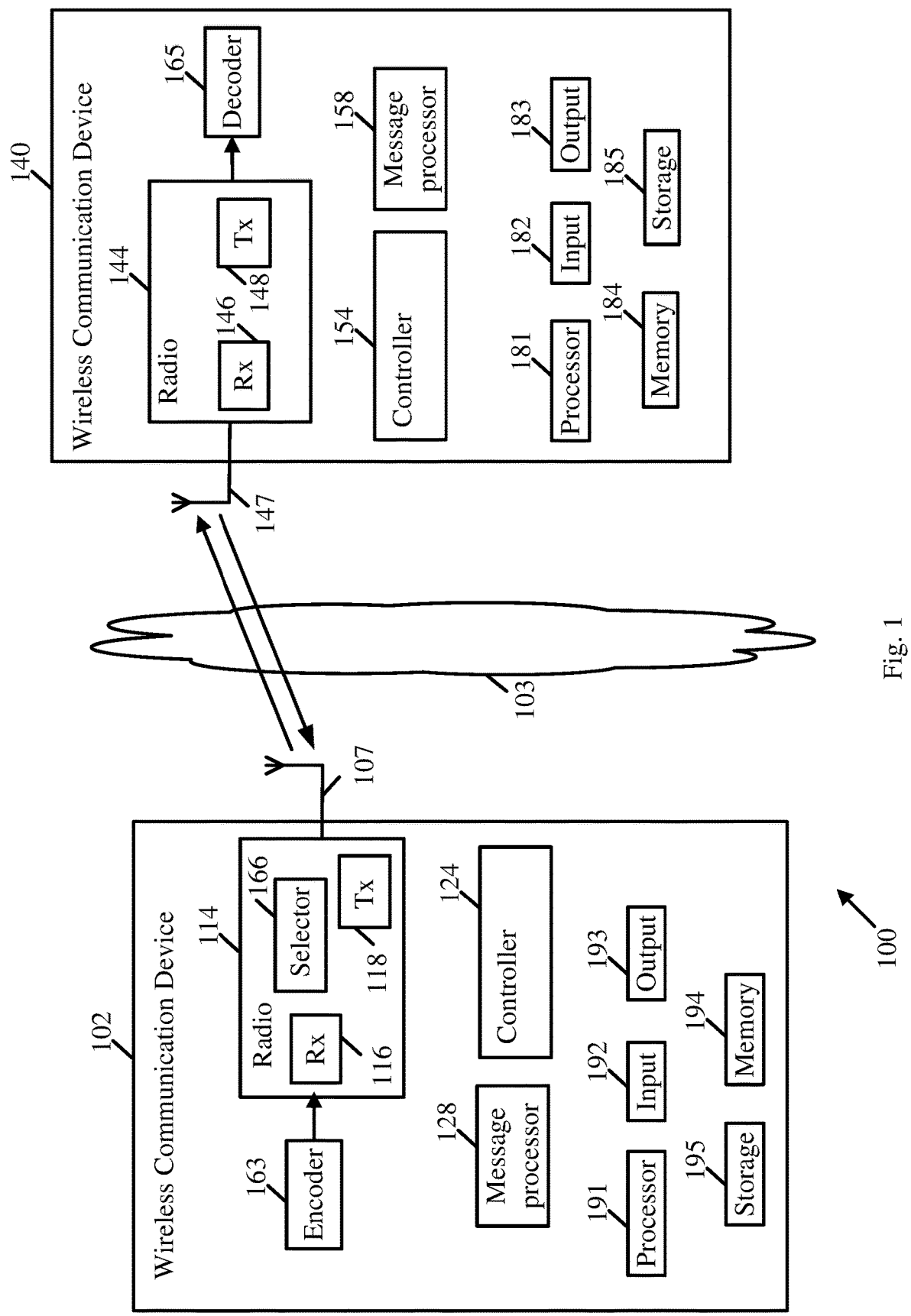
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various aspects" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); and/or IEEE 802.11ay (P802.11ay/D1.0 *Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 7: Enhanced Throughput for Operation in License Exempt Bands Above 45 GHz, November* 2017)) and/or future versions and/or derivatives thereof, devices and/or networks operating in accordance with existing WFA Peer-to-Peer (P2P) specifications (*WiFi P2P technical specification, version 1.7, Jul. 6, 2016*) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011, Final specification*)

and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, or 5 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects are described herein with respect to WiFi communication. However, other aspects may be implemented with respect to any other communication scheme, network, standard and/or protocol.

Reference is now made to FIG. 1, which schematically illustrates a block diagram of a system 100, in accordance with some demonstrative aspects.

As shown in FIG. 1, in some demonstrative aspects system 100 may include a wireless communication network including one or more wireless communication devices, e.g., wireless communication device 102 and/or wireless communication device 140.

In some demonstrative aspects, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, devices 102 and/or 140 may include, operate as, and/or perform the functionality of one or more STAs. For example, device 102 may include at least one STA, and/or device 140 may include at least one STA.

In some demonstrative aspects, devices 102 and/or 140 may include, operate as, and/or perform the functionality of one or more WLAN STAs.

In some demonstrative aspects, devices 102 and/or 140 may include, operate as, and/or perform the functionality of one or more Wi-Fi STAs.

In some demonstrative aspects, devices 102 and/or 140 may include, operate as, and/or perform the functionality of one or more BT devices.

In some demonstrative aspects, devices 102 and/or 140 may include, operate as, and/or perform the functionality of one or more Neighbor Awareness Networking (NAN) STAs.

In some demonstrative aspects, at least one of wireless communication devices 102 and/or 140, e.g., device 102, may include, operate as, and/or perform the functionality of an AP STA, and/or one or more of wireless communication devices 102 and/or 140, e.g., device 140, may include, operate as, and/or perform the functionality of a non-AP STA. In other aspects, devices 102 and/or 140 may operate as and/or perform the functionality of any other STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit

195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative aspects, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative aspects, devices 102 and/or 140 may include one or more radios including circuitry and/or logic to perform wireless communication between devices 102 and/or 140 and/or one or more other wireless communication devices. For example, device 102 may include at least one radio 114, and/or device 140 may include at least one radio 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114, and/or radio 144, transmitters 118, and/or 148, and/or receivers 116, and/or may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114, and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, an mmWave band, a S1G band, and/or any other band.

In some demonstrative aspects, radios 114 and/or 144 may include, or may be associated with, one or more antennas 107, and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, Antennas 107 and/or 147 may include a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform one or more communications, to generate and/or communicate one or more messages and/or transmissions, and/or to perform one or more functionalities, operations and/or procedures between devices 102, 140, and/or one or more other devices; and/or controller 154 may be configured to perform and/or to trigger, cause, instruct and/or control device 140 to perform one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, wireless communication devices 102 and/or 140 may form, or may communicate as part of, a wireless local area network (WLAN).

In some demonstrative aspects, wireless communication devices 102 and/or 140 may form, or may communicate as part of, a WiFi network.

In other aspects, wireless communication devices 102 and/or 140 may form, and/or communicate as part of, any other additional or alternative network.

In some demonstrative aspects, devices 102 and/or 140 may be configured to generate, process, and/or communicate encoded data, e.g., as described below.

In some demonstrative aspects, devices 102 and/or 140 may be configured to communicate encoded video data, e.g., as described below.

In other aspects, devices 102 and/or 140 may be configured to generate, process and/or communicate any other additional or alternative type of encoded data, e.g., multimedia data, audio data, and/or the like.

In some demonstrative aspects, for example, device 102 may be configured to operate as, perform a role of, perform one or more operations of, and/or perform one or more functionalities of, a video source device, which may be configured to generate and/or transmit video data; and/or device 140 may be configured to operate as, perform a role of, perform one or more operations of, and/or perform one or more functionalities of, a video sink device, which may be configured to receive and/or process the video data, e.g., as described below.

In some demonstrative aspects, device 102 may include at least one encoder 163 to encode data to be transmitted by device 102, e.g., as described below.

In one example, device 102 may include one encoder 163. In another example, device 102 may include a plurality of encoders 163.

In some demonstrative aspects, encoder 163 may include circuitry and/or logic configured to encode data according to an encoding scheme, e.g., as described below.

In some demonstrative aspects, for example, encoder 163 may include or may be implemented by, for example, at least one processor, for example, a Central processing Unit (CPU), a Graphics Processing Unit (GPU) and/or any other dedicated or non-dedicated processor, e.g., as described below.

In some demonstrative aspects, device 140 may include at least one decoder 165 to decode encoded video data received by device 140, e.g., from device 102.

In some demonstrative aspects, devices 102 and/or 140 may include Virtual Reality (VR) and/or Augmented Reality (AR) devices, which may be configured, for example, for wireless VR applications and/or wireless AR applications, e.g., as described below.

In one example, device 140 may be configured to operate as, perform a role of, perform one or more operations of, and/or perform one or more functionalities of, a display device, for example, a Head Mounted Display (HMD) and/or any other video display or sink device.

In other aspects, devices 102 and/or 140 may include or may implement any other additional or alternative functionality.

In some demonstrative aspects, in some use cases, scenarios and/or implementations, wireless display systems, such as wireless VR/AR, may use video compression, for example, in order to reduce wireless bandwidth requirements for sending a rendered video stream to a video sink, e.g., an HMD.

In some demonstrative aspects, transmission of video signals may be limited by one or more characteristics of the wireless medium, e.g., a bandwidth of the wireless medium, a data rate of the wireless medium, a range between the transmitter and the receiver, and the like, and/or a power consumption of a device transmitting and/or receiving the video signals. For example, the data rate of the wireless medium may not be sufficient to transmit the video signals, e.g., if the video signals include a relatively large amount of video data, for example, High-Definition-Television (HDTV) data.

In some demonstrative aspects, the video compression method may be utilized to reduce a data size of the video data and/or to enable efficient transmitting of video signals.

In some demonstrative aspects, one major challenge and/or requirement in a wireless display system is ensuring that a compressed video bitstream arrives at the video sink side, e.g. a wireless AR/VR or HMD device with a video decoder, for example, at low latency and/or high robustness.

In some demonstrative aspects, in some cases, such a requirement may be important, or even necessary, for example, in order to avoid dropped frames, which may happen, e.g., when the encoded video data does not arrive on time, e.g., to the video decoder, to be decoded and displayed.

In some demonstrative aspects, in some use cases, scenarios and/or implementations, for example, in wireless display applications, for example, in wireless VR/AR implementations, there may be a technical need to adopt, e.g., very rapidly, a bitrate of an encoded video stream to be transmitted to a video sink device, e.g., to the HMD display, for example, based on one or more parameters, e.g., at least according to changes in wireless link conditions of a wireless communication link between the video source and the video sink.

In one example, it may be very important, or even critical in some cases, to adopt the video bitrate of the encoded video stream, for example, at least in order to mitigate or avoid dropping of frames, which may lead to a bad User Experience (UX).

In some demonstrative aspects, a video bitrate adaptation component may be implemented for ensuring wireless video is delivered on time to the decoder, e.g., as described below.

In some demonstrative aspects, the bitrate adaptation component may be configured to control the encoded video bitrate according, for example, to a current capacity of the wireless communication link and/or one or more other parameters, e.g., as described below.

In some demonstrative aspects, for example, radio 114 and/or controller 124 may be configured to operate as, and/or perform one or more operations and/or functionalities of the bitrate adaptation component, e.g., as described below.

In some demonstrative aspects, there may be a technical need to provide an encoding scheme which may be configured to address or even solve one or more technical problems of one or more potential encoding schemes or solutions, e.g., as described below.

In one example, it may not be advantageous to have an implementation in which a video encoder runs quickly, e.g., much less than 100% duty cycle of the video encoder, for example, to allow changing the video bitrate only for a next video frame.

For example, an implementation of changing the encoded video bitrate once per video frame for the next video frame may not be efficient and/or reliable, for example, since wireless link conditions may change very quickly, and accordingly, video frames and/or parts of video frames may be dropped, e.g., since the video bitrate is not matched to the wireless link capacity.

For example, a reaction time of an encoder to a bitrate request change may be very slow, e.g., up to 11 milliseconds (ms) for a 90 Frames per Second (FPS) VR HMD application, while the wireless link bandwidth may deteriorate very rapidly, e.g., in less than 11 ms, for example, in a few ms, as may happen, for example, for a mmWave link, e.g., a WiGig link.

In another example, it may not be advantageous to have an implementation in which a video encoder runs at close to 100% duty cycle, to allow the video bitrate to be changed during transmission of the encoded video frame.

For example, such an implementation may degrade power efficiency of the system. For example, instead of allowing an encoder to run quickly and then power down to save power, e.g., of the encoder and potentially the memory system and/or an entire SoC, the encoder may need to continuously run in order to allow the radio to request to update the video bitrate with low response latency.

For example, configuring a video encoder to support changing the bitrate with very low latency, e.g. every 1 ms, may require the video encoder to be running all of the time, e.g., at ~100% duty cycle, in order to service a video bitrate change request at the very low latency.

One disadvantage of this approach is that keeping the video encoder and associated subsystem on at ~100% duty cycle may waste power. Therefore, it may be preferable to finish encoding as soon as possible, and then switch the video encoder into a low power state.

Another disadvantage of this approach, for example, when Software (SW) encoding is used, is running the encoder at close to 100% duty cycles, which may result in a risk of not finishing the encoding on time and/or dropping one or more video frames, e.g. due to OS and/or SW jitter.

Another disadvantage of this approach, which may be very important or even most important in some cases, is that it may be very difficult for a video encoder to adjust its output video bitrate at sub video frame granularity, making implementation and validation much more complex and/or lengthy.

In some demonstrative aspects, devices 102 and/or 140 may be configured according to an encoding scheme which may provide one or more technical benefits, for example, at least by allowing to rapidly adopt the encoded video bitrate, for example, at least according to wireless link condition changes, e.g., as described below.

Some demonstrative aspects are described below with respect to an encoding scheme (also referred to as "multi bitrate encoding scheme"), which is configured to support adopting an encoding bitrate based on one or more parameters of a wireless communication link.

In some demonstrative aspects, the encoding scheme may be configured to support adopting the encoding bitrate, for example, based on one or more additional or alternative parameters, for example, a power state, a power consumption, a bandwidth, and/or any other parameter, e.g., as described below.

In some demonstrative aspects, the encoding scheme may support adopting of the encoding bitrate, for example, even in cases where the video encoder runs much faster than real-time, which may mean that the video bitrate of the video encoder can only be changed infrequently, e.g., as described below.

In some demonstrative aspects, the encoding scheme may be configured to decouple an encoder duty cycle of a video encoder from a wireless radio duty cycle of a wireless communication link, thereby allowing to save power, improve user experience and/or simplify an encoder design.

In some demonstrative aspects, the at least one encoder 163 of device 102 may be configured to generate two or more encoded video streams, for example, in parallel, e.g., as described below.

In some demonstrative aspect, device 102 may implement the at least one encoder 163 to generate two or more encoded video streams with two or more different video bitrates, e.g., as described below.

In one example, each encoded video stream may be encoded at a different bitrate, e.g., as described below.

In some demonstrative aspects, encoder 163 may be configured to encode video data into a parallel plurality of encoded video streams, e.g., as described below.

In some demonstrative aspects, the parallel plurality of encoded video streams may include the video data encoded according to a respective plurality of different video bitrates, e.g., as described below.

In some demonstrative aspects, controller 124 may be configured to cause, trigger, and/or control a wireless communication station implemented by device 102 to dynamically select a selected video stream from the parallel plurality of encoded video streams including the video data encoded according to the respective plurality of different video bitrates, e.g., as described below.

In some demonstrative aspects, device 102 may include a selector 166 configured to select the selected encoded video stream from the parallel plurality of encoded video streams, for example, based on one or more parameters corresponding to the condition of the wireless communication link, e.g., as described below.

In some demonstrative aspects, at least part of the functionality of selector 166 may be implemented as part of radio 114, and/or as part of controller 124. In one example, selector 166 may be implemented as part of a chip or SoC including the radio 114 and/or controller 124.

In other aspects, the functionality of selector 166 may be implemented as part of any other element of device 102.

In some demonstrative aspects, controller 124 may be configured to cause, trigger, and/or control the wireless communication station implemented by device 102 to transmit the selected encoded video stream over the wireless communication link, e.g., as described below.

In some demonstrative aspects, radio 114 and/or transmitter 118 may be configured to transmit the selected encoded video stream over the wireless communication link.

In some demonstrative aspects, controller 124 may be configured to cause, trigger, and/or control the wireless communication station implemented by device 102 to dynamically select the selected video stream, for example, by selecting, based on a value of at least one parameter corresponding to a condition of the wireless communication link, a first encoded video stream from the parallel plurality of encoded video streams, and, based on a change in the value of the at least one parameter, selecting a second encoded video stream from the parallel plurality of encoded video streams, e.g., as described below.

In some demonstrative aspects, the first encoded video stream may include the video data encoded according to a first video bitrate, and/or the second encoded video stream may include the video data encoded according to the second video bitrate different from the first video bitrate.

In some demonstrative aspects, the at least one parameter corresponding to the condition of the wireless communication link may include at least one parameter corresponding to the link capacity of the wireless communication link, e.g., as described below.

In some demonstrative aspects, the first video bitrate may correspond to a first link capacity of the wireless communication link, and/or the second video bitrate may correspond to a second link capacity of the wireless communication link, e.g., as described below.

In some demonstrative aspects, selector 166 may be configured to select the first encoded video stream having the first video bitrate for the first link capacity of the wireless communication link, and/or to select the second encoded video stream having the second video bitrate for the second link capacity of the wireless communication link, e.g., as described below.

In some demonstrative aspects, the first video bitrate may be greater than the second video bitrate, and the first link capacity may be greater than the second link capacity, e.g., as described below.

In some demonstrative aspects, the first encoded video stream may include encoded video data of a first portion of a video frame, and the second encoded video stream may include encoded video data of a second portion of the video frame, e.g., as described below.

In some demonstrative aspects, selector 166 may be configured to, during transmission of the video frame, select a first selected encoded video stream for transmission of a first portion of the video frame, and switch to a second selected video stream for transmission of a second portion of the video frame, e.g., as described below.

In some demonstrative aspects, radio 114 and/or selector 166 may be configured to select and switch between the parallel plurality of encoded video streams, for example, very quickly, e.g. every 1 ms or any other rate, which may be much shorter than a video frame duration.

In some demonstrative aspects, selector 166 may be configured to select the selected encoded video stream, for example, based on a link capacity indication from the radio 114, e.g., as described below.

In some demonstrative aspects, radio 114 may send an indication to selector 166 to indicate the link capacity of the wireless communication link, e.g., as described below.

In some demonstrative aspects, for example, the radio 114 and/or selector 166 may be configured to switch between the parallel plurality of encoded video streams, for example, according to one or more parameters of the wireless link between device 102 and device 140, e.g., according to a current wireless bandwidth of the wireless communication link between device 102 and device 140, e.g., as described below.

In some demonstrative aspects, device 102 and/or encoder 163 may be configured to provide to radio 114 bitstream information corresponding to the parallel plurality of encoded video streams, for example, as metadata attached to the video bitstreams, e.g., as described below.

In some demonstrative aspects, an encoded video stream of the parallel plurality of encoded video streams may include bitstream information corresponding to the encoded video stream, e.g., as described below.

In some demonstrative aspects, video encoder 163 may be configured to generate the bitstream information corresponding to the parallel plurality of encoded video streams, e.g., as described below.

In some demonstrative aspects, the bitstream information corresponding to the encoded video stream may include an indication of a video frame, and/or an indication of a video bitrate of the encoded video stream, e.g., as described below.

In some demonstrative aspects, the bitstream information corresponding to the encoded video stream may include at least an indication of a portion of the video frame, e.g., as described below.

In some demonstrative aspects, the bitstream information corresponding to the encoded video stream may include metadata appended to the encoded video stream, e.g., as described below.

In some demonstrative aspects, video encoder 163 may be configured to generate the bitstream information corresponding to the encoded video stream, for example, in the form of metadata appended to the encoded video stream.

In one example, the bitstream information may be shared ahead of time between the encoder 163 and radio 114. For example, the bitstream information may be shared between the encoder 163 and radio 114, for example, by using different queues for each video stream, and the video bitrate for each queue/video stream may be configured before encoder 163 starts encoding each video frame of the video data.

In some demonstrative aspects, device 102 may be configured to cause encoder 163 to adjust a configuration of the parallel plurality of encoded video streams, e.g., as described below.

In some demonstrative aspects, controller 124 may be configured to cause, trigger, and/or control the wireless communication station implemented by device 102 to adjust a configuration of the parallel plurality of encoded video streams, e.g., as described below.

In some demonstrative aspects, controller 124 may be configured to adjust the configuration of the parallel plurality of encoded video streams, e.g., as described below.

In some demonstrative aspects, the configuration of the parallel plurality of encoded video streams may include a count of the parallel plurality of encoded video streams, and/or the plurality of different video bitrates of the parallel plurality of encoded video streams, e.g., as described below.

In some demonstrative aspects, controller 124 may be configured to cause, trigger, and/or control the wireless communication station implemented by device 102 to determine the configuration of the parallel plurality of encoded video streams based on a power state of a video source, e.g., device 102, and/or a movement state of the video source, e.g., as described below.

In some demonstrative aspects, controller 124 may be configured to determine the configuration of the parallel plurality of encoded video streams based on the power state of the video source, e.g., device 102, and/or the movement state of the video source, e.g., as described below.

In some demonstrative aspects, controller 124 may be configured to cause, trigger, and/or control the wireless communication station implemented by device 102 to determine the configuration of the parallel plurality of encoded video streams, for example, based on state information from a video sink, which is to receive the video data, for example, device 140, e.g., as described below.

In some demonstrative aspects, radio 114 may be configured to receive the state information from device 140, which is to receive the video data, and controller 124 may be configured to determine the configuration of the parallel plurality of encoded video streams based on the state information from device 140.

In some demonstrative aspects, the state information may include a power state indication to indicate a power state of the video sink, e.g., device 140, and/or a movement indication to indicate a movement state of the video sink.

In some demonstrative aspects, the encoding scheme utilizing the parallel plurality of encoded video streams may provide one or more technical benefits and/or advantages, e.g., as described below.

In some demonstrative aspects, for example, the encoding scheme utilizing the parallel plurality of encoded video streams may allow to reuse existing video encoders, which typically support modifying their output bitrate only once per video frame, for example, even for cases such as wireless VR/AR systems, e.g., where a much faster video bitrate adaptation reaction time is needed.

In some demonstrative aspects, for example, the encoding scheme utilizing the parallel plurality of encoded video streams may allow power saving, for example, by having a video encoder run as fast as possible, and then shutting down, e.g., instead of keeping the video encoder awake and waiting for bitrate change requests from the wireless radio.

In some demonstrative aspects, for example, device 102 may be configured according to a multi bitrate encoding scheme, which may allow to control encoder 163 to run as fast as possible, e.g., thus saving power, and/or may support changing the video bitrate only once per video frame, e.g., thus simplifying the encoder implementation, for example, while allowing the wireless radio 114 to adjust the encoded video bitrate very rapidly, at sub video frame resolution, e.g. every 1 ms, e.g., as described below.

Figure 2:
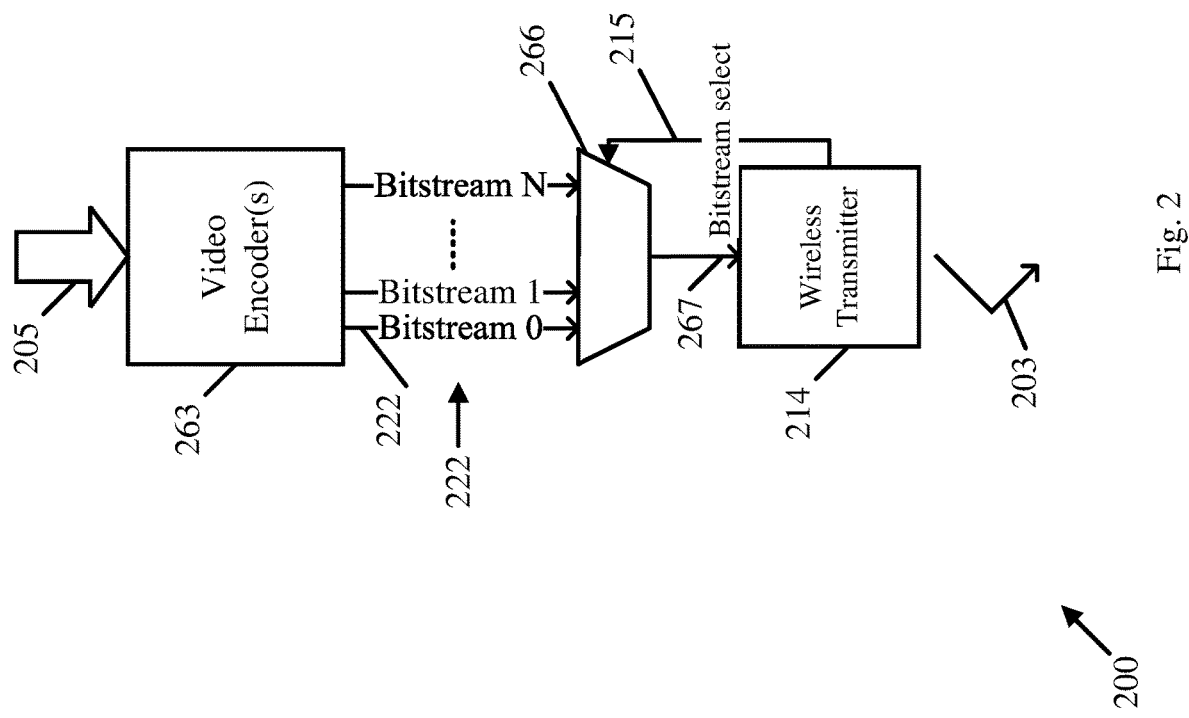
FIG. 2 is a schematic illustration of a multi bitrate encoding scheme, in accordance with some demonstrative aspects.

Reference is made to FIG. 2, which schematically illustrates multi bitrate encoding scheme 200, in accordance with some demonstrative aspects.

In some demonstrative aspects, as shown in FIG. 2, one or more video encoders 263 may be configured to encode video data, which may be wirelessly transmitted over a wireless communication link 203 by a wireless transmitter 214, e.g., to an VR/AR HMD.

In some demonstrative aspects, for example, encoder 163 (FIG. 1) may be configured to operate as, perform a role of, perform one or more operations of, and/or perform one or more functionalities of, the one or more encoders 263; and/or radio 114 (FIG. 1) may be configured to operate as, perform a role of, perform one or more operations of, and/or perform one or more functionalities of wireless transmitter 214.

In some demonstrative aspects, as shown in FIG. 2, the one or more encoders 263 may be configured to generate a parallel plurality of encoded video streams 222, denoted "Bistream 0, Bitstream 1, . . . Bitstream". For example, each encoded video stream 222 may have a different video bitrate.

In some demonstrative aspects, for example, if needed, a video bitrate of at least one encoded video stream 222, e.g., even of each encoded video stream 212, may be controlled and/or adjusted, for example, for a next video frame, e.g., as described below.

In some demonstrative aspects, the one or more encoders 263 may be configured to provide bitstream information corresponding to the parallel plurality of encoded video streams 222, e.g., in the form of metadata and/or any other form.

In some demonstrative aspects, for example, the bitstream information corresponding to an encoded video stream 222 may include at least information indicating a video bitrate of the encoded video stream, a video frame indication to indicate to which video frame data in the bitstream corresponds, and/or frame portion information to indicate to which portion of the video frame the data in the bitstream corresponds. Any other additional or alternative information may be implemented.

In some demonstrative aspects, as shown in FIG. 2, a multiplexer 266 may be controlled, for example, by the wireless transmitter 214, e.g., by a control signal 215, to select, a selected encoded video stream 267 from the parallel plurality of encoded video streams 222, for example, based on one or more parameters corresponding to a condition of the wireless communication link 203. For example, selector 166 (FIG. 1) may be configured to operate as, perform a role of, perform one or more operations of, and/or perform one or more functionalities of multiplexer 266.

In one example, radio 214 may control multiplexer 266, for example, to select the selected encoded video stream 267, e.g., periodically.

In some demonstrative aspects, for example, periodically, at sub video frame time resolution, e.g. every 1 ms, the transmitter 214, may select which encoded video stream from the parallel plurality of encoded video streams 222 to transmit.

In some demonstrative aspects, the transmitter 214 may be configured to select an encoded video stream to be transmitted, for example, at least according to the wireless link capacity and/or one or more additional or alternative parameters.

In some demonstrative aspects, for example, the transmitter 214, may be configured to select the encoded video stream to be transmitted, for example, based on the bitstream information corresponding to the encoded video stream, e.g., the metadata appended to the encoded video stream.

In some demonstrative aspects, having several encoded video streams 222 to choose from, may allow the transmitter 214 to choose selected encoded video stream 267, for example, based on one or more criteria, for example, the highest bitstream that will fit inside the currently available wireless link bandwidth of wireless communication link 203 and/or any other additional or alternative criterion.

In some demonstrative aspects, the ability to choose selected encoded video stream 267 from the parallel plurality of encoded video streams 222 with the plurality of different video bitrates may allow increasing, e.g., maximizing, video quality; reducing, e.g., minimizing, the probability of dropped video frames; and/or decoupling the encoder activity of encoder 263 from the transmitter link access of transmitter 214, thereby allowing both components to work at a power efficient operating point.

In one example, for example, in a WiGig VR application implementation, the encoding may be performed by a Graphic Processing Unit (GPU), and encoding a video frame, of duration $\frac{1}{90}$ of a second (11.1 ms) may take 500 microseconds (usec) on the GPU. According to this example, the GPU can encode the video frame, for example, according to two, three, or even more different video bitrates, for example 1 Gbps, 0.6 Gbps and/or 0.3 Gbps, in a very short amount of time, e.g., utilizing idle cycles after rendering the VR content.

In one example, metadata may be added to the encoded video streams, conveying to which video frame and to which part of the video frame they correspond.

For example, the video frame, e.g., with the duration of 11.1 ms, may be split into 10 rows, each with $\frac{1}{10}$ of the scanlines of the video frame. According to this example, for each $\frac{1}{10}^{th}$ of the video frame, e.g., for the next $\frac{1}{90} * \frac{1}{10} = \frac{1}{900}$th of a second of encoded video, the multiplexer 266 may choose to select an encoded video stream from the parallel plurality of encoded video streams 222 whose video bitrate is the highest but below the available wireless link capacity of wireless communication link 203.

In another example, multi bitrate encoding scheme 200 may enable a first encoder, e.g., a CPU, to be used to encode one or more first video streams at a low bitrate, while a second encoder, e.g., a GPU or a dedicated HW encoder, may be used to encode one or more second video streams at a higher bitrate. For example, encoding at lower video bitrates may take less cycles, so it will be easier for the CPU to handle this task, while the GPU or the dedicated HW may perform the more compute intensive high video bitrate encoding.

In some demonstrative aspects, the encoding scheme described herein may provide scalability, for example, according to available encoding resources.

In one example, a high end GPU may be able to encode in more bitrates, e.g., thus improving image quality since the selected video stream 267 can be more closely matched to the wireless link capacity of wireless communication link 203.

In another example, on a lower performance system or a system with limited energy, e.g., a laptop or mobile device with a battery that is nearly empty, the number of encoded video streams 222 can be reduced, e.g., even to only two, and power requirements will be scaled down accordingly.

In some demonstrative aspects, a count of the parallel plurality of encoded video streams 222 an/or a video bitrate in one or more video streams, e.g., each video stream, may be dynamically adjusted and/or configured, for example, periodically, e.g., once per video frame, and/or according to any other scheme.

In some demonstrative aspects, for example, the number of parallel plurality of encoded video streams 263 and/or the video bitrate in each video stream may be dynamically adjusted and/or configured, for example, according to estimations about link robustness of wireless communication link 203, e.g., as described below.

For example, if the wireless communication link 203 has been stable and supporting a high bandwidth for a while, a maximum video bitrate to be used can be increased, e.g., resulting with a corresponding improvement in image quality.

In some demonstrative aspects, a "configuration decision logic" block may be configured to control and/or adjust the individual video bitrates that each of the encoded video streams will use, and/or the number of the parallel plurality of encoded video streams 222 being generated, e.g., as described below.

In some demonstrative aspects, the configuration decision logic may be configured to make a decision, for example, while taking into account one or more parameters and/or criteria, for example, wireless transmitter (SRC) power state/battery level, wireless transmitter (SRC) Sensor hub, e.g. if a mobile device is used as source, we can detect it has not moved for a while, wireless receiver (SNK) power state/battery level, wireless receiver (SNK) sensor hub, e.g. when the wireless receiver has not moved for a while, and/or any other additional or alternative parameter or criterion.

Figure 3:
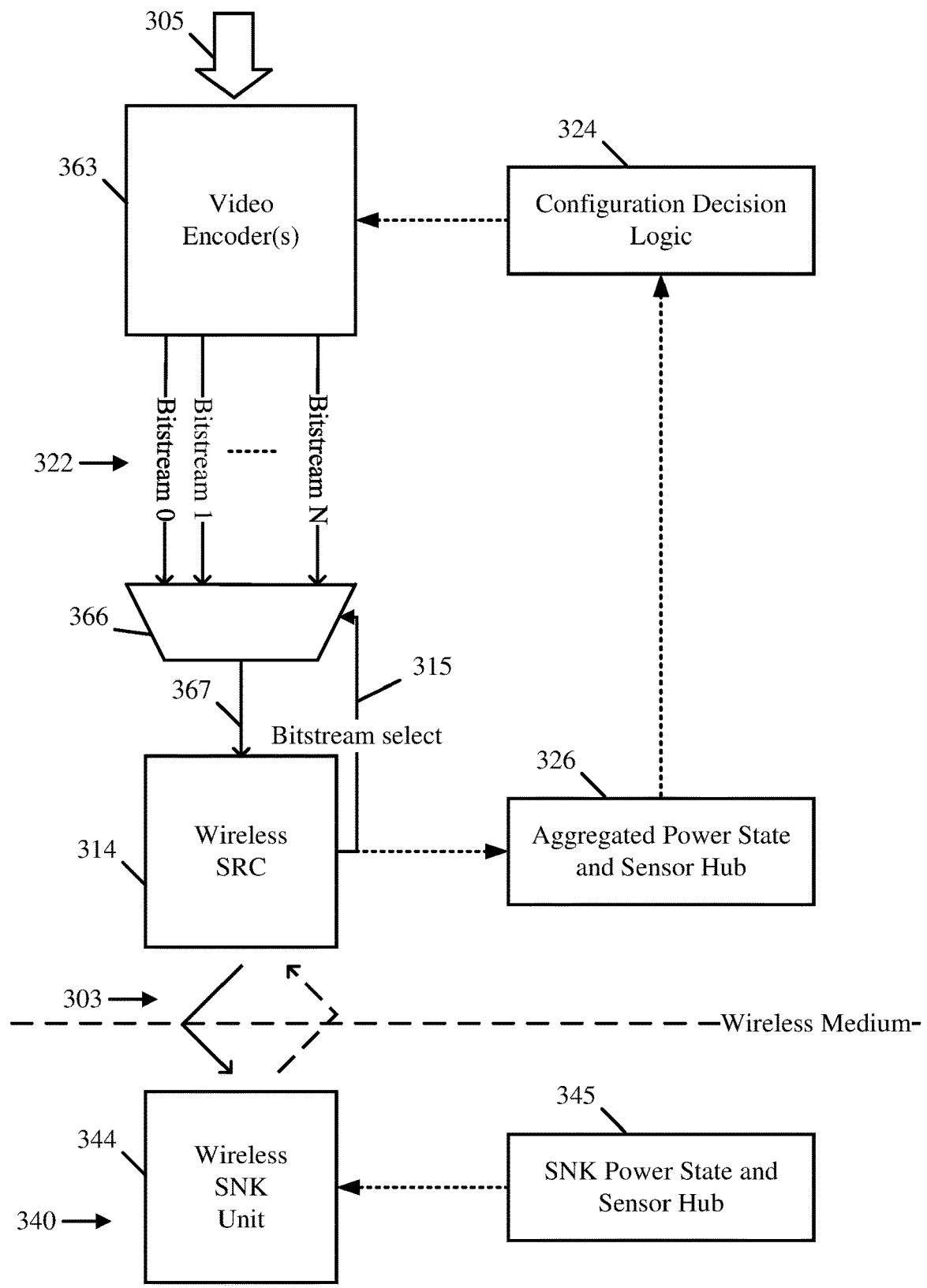
FIG. 3 is a schematic illustration of a multi bitrate encoding scheme, in accordance with some demonstrative aspects.

Reference is made to FIG. 3, which schematically illustrates a multi bitrate encoding scheme 300, in accordance with some demonstrative aspects.

In some demonstrative aspects, as shown in FIG. 3, one or more video encoders 363 may be configured to encode video data, which may be wirelessly transmitted over a wireless communication link 303 by a wireless transmitter 314, e.g., to a VR/AR HMD.

In some demonstrative aspects, for example, encoder 163 (FIG. 1) may be configured to operate as, perform a role of, perform one or more operations of, and/or perform one or more functionalities of, the one or more encoders 363; and/or radio 114 (FIG. 1) may be configured to operate as, perform a role of, perform one or more operations of, and/or perform one or more functionalities of wireless transmitter 314.

In some demonstrative aspects, as shown in FIG. 3, the one or more encoders 363 may be configured to generate a parallel plurality of encoded video streams 322, denoted "Bistream 0, Bitstream 1, . . . Bitstream", for example, each encoded video stream has a different video bitrate.

In some demonstrative aspects, for example, if needed, a video bitrate of at least one encoded video stream, e.g., even of each encoded video stream, may be controlled and/or adjusted, for example, for a next video frame, e.g., as described below.

In some demonstrative aspects, as shown in FIG. 3, a multiplexer 366 may be controlled, for example, by the wireless transmitter 314, e.g., by a control signal 315, to select, a selected encoded video stream 367 from the parallel plurality of encoded video streams 322, for example, based on one or more parameters corresponding to a condition of the wireless communication link 303. For example, selector 166 (FIG. 1) may be configured to operate as, perform a role of, perform one or more operations of, and/or perform one or more functionalities of multiplexer 366.

In some demonstrative aspects, for example, the one or more encoders 363 may be controlled to generate the parallel plurality of encoded video streams 322, for example, by controlling a count of the parallel plurality of encoded video streams 322 and/or a video bitrate of one or more of the parallel plurality of encoded video streams 322, for example, based on one or more parameters of a transmitter device including encoders 363 and/or based on a feedback from a receiver device 340 to receive video data 305 for a video sink device 340, e.g., as described below.

In some demonstrative aspects, a controller 324 ("configuration decision logic") may be configured to adjust the configuration of the parallel plurality of encoded video streams 322, e.g., as described below.

In some demonstrative aspects, the configuration of the parallel plurality of encoded video streams 322 may include a count of the parallel plurality of encoded video streams 322, the plurality of different video bitrates of the parallel plurality of encoded video streams 322, and/or any other additional or alternative parameter and/or criterion.

In some demonstrative aspects, controller 324 may be configured to determine the configuration of the parallel plurality of encoded video streams 322, for example, based on state information 326 of a video source including encoders 363.

In some demonstrative aspects, state information 326 may include, for example, a power state of the video source, a movement state of the video source, and/or any other additional or alternative parameter and/or state.

In some demonstrative aspects, controller 324 may determine the configuration of the parallel plurality of encoded video streams 322, for example, based on sink state information 345 from a wireless sink unit 3344 of video sink device 340, which is to receive the video data 305.

In some demonstrative aspects, the sink state information 345 may include a power state indication to indicate a power state of the video sink device 340, a movement indication to indicate a movement state of the video sink 340, and/or any other additional or alternative parameter and/or state.

In some demonstrative aspects, radio 314 may receive the sink state information 345, for example, from a wireless sink transmitter of the video sink device 340.

Referring back to FIG. 1, in some demonstrative aspects, for example, the encoding scheme utilizing the parallel plurality of encoded video streams, e.g., encoding schemes 200 (FIG. 2) and/or 300 (FIG. 3), may be implemented to target very low latency wireless display applications, e.g., such as wireless VR/AR HMD.

In some demonstrative aspects, for example, the encoding scheme utilizing the parallel plurality of encoded video streams may enable a reduced incremental latency for sending video across the wireless link, for example, less than 5 ms wireless latency.

In some demonstrative aspects, for example, the encoding scheme utilizing the parallel plurality of encoded video streams may allow addressing an issue of adjusting a video bitrate of an encoded video stream, for example, in a middle of a video frame. For example, some encoders may not be able to adjust a video bitrate of an encoded video stream in the middle of the video frame, for example, since they encode quickly the video frame and go to sleep, e.g., until a next video frame, and/or if such an adjustment is not supported by the encoders.

In some demonstrative aspects, for example, the encoding scheme utilizing the parallel plurality of encoded video streams may enable decoupling of encoding time from transmission time, for example, while allowing a quick adjust to wireless link issues. This may save power, e.g., if the encoder is a part of a SoC, which may consume a lot of power when running; and/or may reduce frame drops, for example, by quickly adjusting to wireless link conditions. For example, technical problems of multi bitrate applications, e.g., such as distributing video over limited BW to multiple decoders (set top boxes), may not face latency and power constraints.

In some demonstrative aspects, the decoupling of the encoding time from the transmission time may additionally and/or alternatively allow encoders to run very quickly, and yet to maintain an ability to modify an encoded video bitrate. For example, an encoder may finish encoding video data in 4 ms, while encoding a 90 FPS video, e.g., a new frame every 11.1 ms.

In some demonstrative aspects, a multi bitrate encoding scheme, e.g., multipartite encoding scheme 200 (FIG. 2) and/or 300 (FIG. 3), may be implemented by one or more configurations, functionalities and/or operations, e.g., as described below.

In some demonstrative aspects, the multi bitrate encoding scheme may be implemented by instantiating multiple HW copies of a regular encoder and running the encoders in parallel, e.g., with different target video bitrate settings.

In some demonstrative aspects, the multi bitrate encoding scheme may be implemented by running encoding of video data in serial, e.g., encode each frame several times, for example, each time with a different video bitrate setting.

In some demonstrative aspects, the multi bitrate encoding scheme may additionally and/or alternatively be implemented by performing initial encoding stages, e.g., such as transforms, and then performing decimation and entropy encoding multiple times, for example, in order to generate multiple output streams in different bitrates. This may reduce an additional cost of multiple bitrate encoding, e.g., compared to the operations described above, which duplicate all of the encoding work.

In some demonstrative aspects, multi bitrate encoding may be utilized, for example, when Intra only encoding is being used with multiple slice/tile rows per image. In this case, each slice/tile row may be encoded with different video bitrate and each slice/tile is encoded independently of the other images and slices/tile rows.

In some demonstrative aspects, to implement multi bitrate encoding with Inter (I+P) encoding, the wireless transmitter may be configured to provide feedback to the encoder on which video bitrate was used on each slice/tile row in the previous image so the encoder will know to which reference frame/tile/slice to refer for the previous video frame.

In some demonstrative aspects, in some use cases, implementations and/or scenarios, for example, for applications such as VR, it may be more important to maintain video smoothness than video quality. For example, a lower quality smooth image, e.g., without tears and/or judder, may have an increased UX, for example, compared to a higher quality torn image. Additionally, people may be more tolerant to temporary reductions in image quality of a video compared to tears/judder in the video. This may be determined, for example, based on experience of developing wireless docking and wireless VR products.

In some demonstrative aspects, since a switching point between video bitrates is at the slice/tile row level, encoded video streams may be standard compliant, e.g., in accordance with H.264/H.265 standards, therefore, there may be no change on the decoder side.

Figure 4:
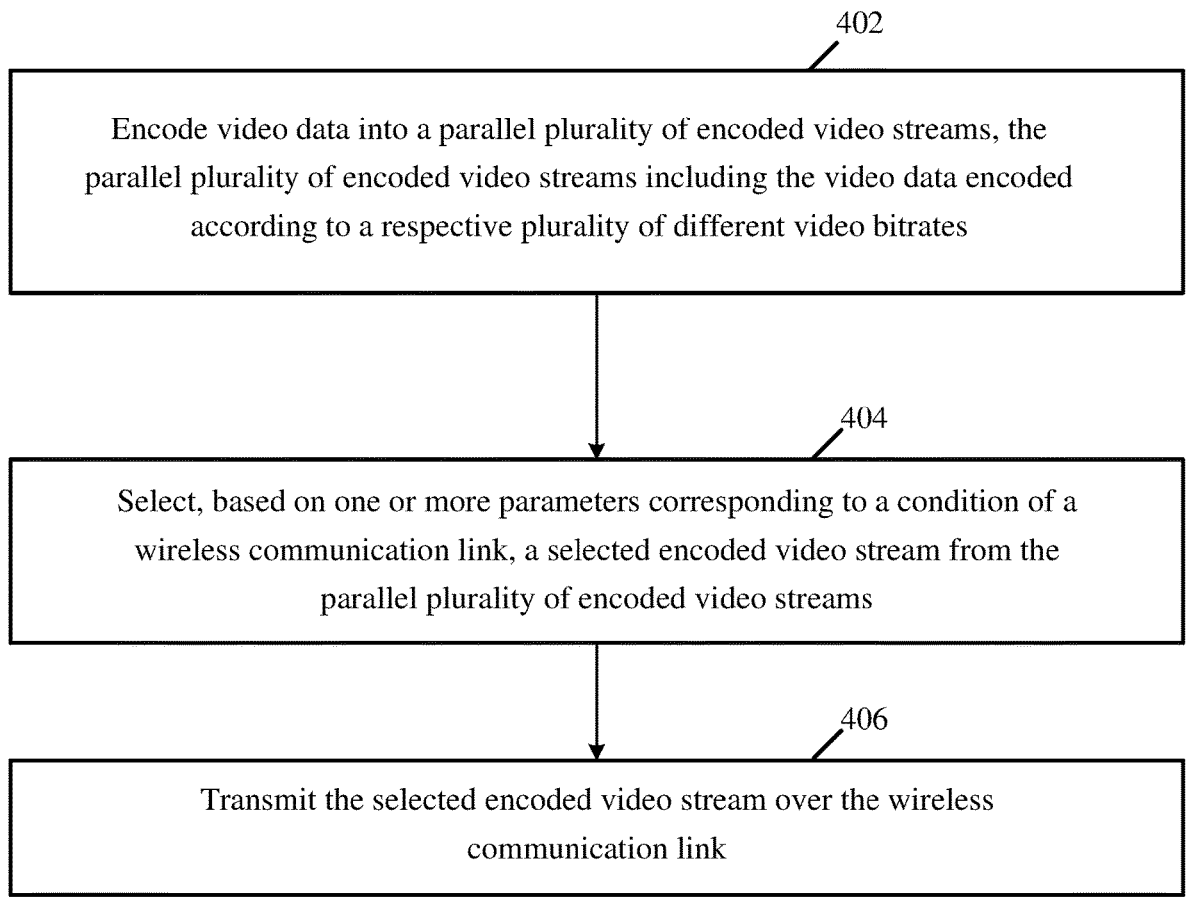
FIG. 4 is a schematic flow-chart illustration of a method of video encoding, in accordance with some demonstrative aspects.

Reference is made to FIG. 4, which schematically illustrates a method of video encoding. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1), and/or controller 154 (FIG. 1), a radio, e.g., radio 114 (FIG. 1) and/or radio 144 (FIG. 1), an encoder, e.g., encoder 163 (FIG. 1), a selector, e.g., selector 166 (FIG. 1), and/or a message processor, e.g., message processor 128 (FIG. 1) and/or message processor 158 (FIG. 1).

As indicated at block 402, the method may include encoding video data into a parallel plurality of encoded video streams, the parallel plurality of encoded video streams including the video data encoded according to a respective plurality of different video bitrates. For example, encoder 163 (FIG. 1) may encode the video data into the parallel plurality of encoded video streams including the video data encoded according to the respective plurality of different video bitrates, e.g., as described above.

As indicated at block 404, the method may include selecting, based on one or more parameters corresponding to a condition of a wireless communication link, a selected encoded video stream from the parallel plurality of encoded video streams. For example, selector 166 (FIG. 1) may be configured to select, based on the one or more parameters corresponding to the condition of the wireless communication link, the selected encoded video stream from the parallel plurality of encoded video streams, e.g., as described above.

As indicated at block 406, the method may include transmitting the selected encoded video stream over the wireless communication link. For example, radio 114 (FIG. 1) may transmit the selected encoded video stream over the wireless communication link, e.g., as described above.

Figure 5:
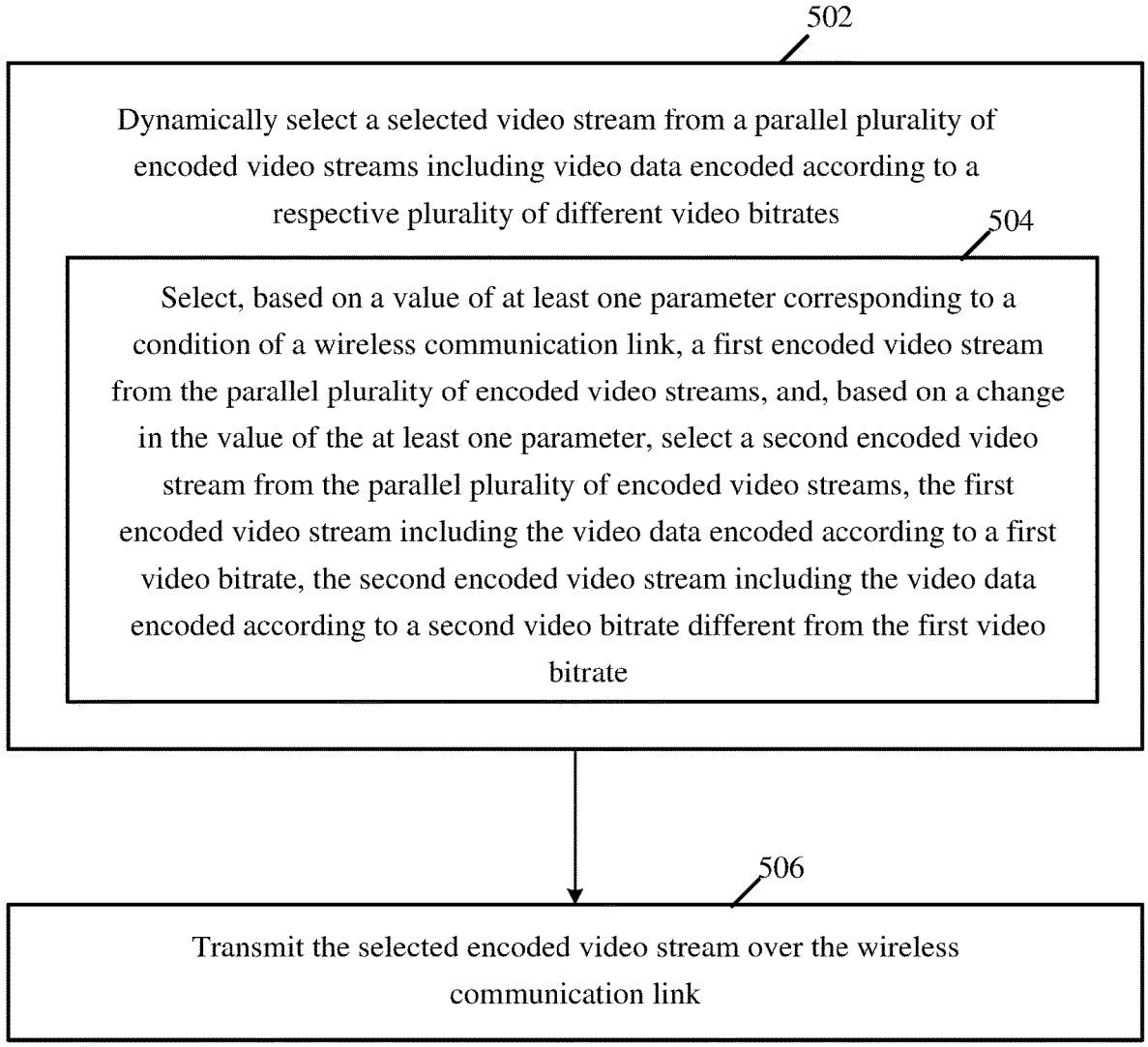
FIG. 5 is a schematic flow-chart illustration of a method of video encoding, in accordance with some demonstrative aspects.

Reference is made to FIG. 5, which schematically illustrates a method of video encoding. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1), and/or controller 154 (FIG. 1), a radio, e.g., radio 114 (FIG. 1) and/or radio 144 (FIG. 1), an encoder, e.g., encoder 163 (FIG. 1), a selector, e.g., selector 166 (FIG. 1), and/or a message processor, e.g., message processor 128 (FIG. 1) and/or message processor 158 (FIG. 1).

As indicated at block 502, the method may include dynamically selecting a selected video stream from a parallel plurality of encoded video streams including video data encoded according to a respective plurality of different video bitrates. For example, For example, controller 124 (FIG. 1) may be configured to cause, trigger, and/or control the STA implemented by device 102 (FIG. 1) to dynamically select the selected video stream from the parallel plurality of encoded video streams including the video data encoded according to the respective plurality of different video bitrates, e.g., as described above.

As indicated at block 504, dynamically selecting the selected video stream from the parallel plurality of encoded video streams may include selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream including the video data encoded according to a first video bitrate, the second encoded video stream including the video data encoded according to a second video bitrate different from the first video bitrate. For example, controller 124 (FIG. 1) may be configured to cause, trigger, and/or control the STA implemented by device 102 (FIG. 1) to select, based on the value of the at least one parameter corresponding to the condition of the wireless communication link, the first encoded video stream from the parallel plurality of encoded video streams, and, based on the change in the value of the at least one parameter, may select the second encoded video stream from the parallel plurality of encoded video streams, e.g., as described above.

As indicated at block 506, the method may include transmitting the selected encoded video stream over the wireless communication link. For example, controller 124 (FIG. 1) may be configured to cause, trigger, and/or control the STA implemented by device 102 (FIG. 1) to transmit the selected encoded video stream over the wireless communication link, e.g., as described above.

Figure 6:
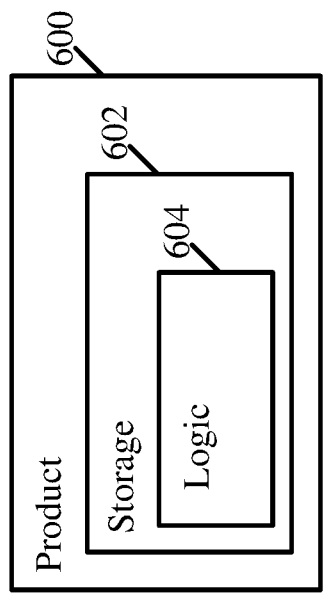
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), encoder 163 (FIG. 1), selector 166 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), encoder 163 (FIG. 1), selector 166 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, and/or 5, and/or one or more operations described herein. The phrases "non-transitory machine-readable medium" and "computer-readable non-transitory storage media" are directed to include all computer-readable media, with the sole exception being a transitory propagating signal.

In some demonstrative aspects, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further aspects.

Example 1 includes an apparatus comprising a video encoder configured to encode video data into a parallel plurality of encoded video streams, the parallel plurality of encoded video streams comprising the video data encoded according to a respective plurality of different video bitrates; a selector configured to select, based on one or more parameters corresponding to a condition of a wireless communication link, a selected encoded video stream from the parallel plurality of encoded video streams; and a radio to transmit the selected encoded video stream over the wireless communication link.

Example 2 includes the subject matter of Example 1, and optionally, wherein the one or more parameters comprise at least one parameter corresponding to a link capacity of the wireless communication link.

Example 3 includes the subject matter of Example 2, and optionally, wherein the selector is configured to select a first encoded video stream having a first video bitrate for a first link capacity of the wireless communication link, and to select a second encoded video stream having a second video bitrate for a second link capacity of the wireless communication link, the first video bitrate is greater than the second video bitrate, the first link capacity is greater than the second link capacity.

Example 4 includes the subject matter of any one of Examples 1-3, and optionally, wherein the selector is configured to select the selected encoded video stream based on a link capacity indication from the radio.

Example 5 includes the subject matter of any one of Examples 1-4, and optionally, wherein the selector is configured to, during transmission of a video frame, select a first selected encoded video stream for transmission of a first portion of the video frame, and switch to a second selected video stream for transmission of a second portion of the video frame.

Example 6 includes the subject matter of any one of Examples 1-5, and optionally, wherein the video encoder is configured to generate bitstream information corresponding to the parallel plurality of encoded video streams, bitstream information corresponding to an encoded video stream of the parallel plurality of encoded video streams comprises at least one of an indication of a video frame, or an indication of a video bitrate of the encoded video stream.

Example 7 includes the subject matter of Example 6, and optionally, wherein the bitstream information corresponding to the encoded video stream comprises at least an indication of a portion of the video frame.

Example 8 includes the subject matter of Example 6 or 7, and optionally, wherein the video encoder is configured to generate the bitstream information corresponding to the encoded video stream in the form of metadata appended to the encoded video stream.

Example 9 includes the subject matter of any one of Examples 1-8, and optionally, comprising a controller to cause the video encoder to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 10 includes the subject matter of Example 9, and optionally, wherein the controller is configured to determine the configuration of the parallel plurality of encoded video streams based on at least one of a power state of a video source comprising the video encoder, or a movement state of the video source.

Example 11 includes the subject matter of Example 9 or 10, and optionally, wherein the radio is configured to receive state information from a video sink, which is to receive the video data, the controller configured to determine the configuration of the parallel plurality of encoded video streams based on the state information from the video sink.

Example 12 includes the subject matter of Example 11, and optionally, wherein the state information comprises at least one of a power state indication to indicate a power state of the video sink, or a movement indication to indicate a movement state of the video sink.

Example 13 includes the subject matter of any one of Examples 1-12, and optionally, comprising a processor, a memory, and one or more antennas.

Example 14 includes an system of wireless communication comprising a wireless communication station (STA), the STA comprising a processor; a memory; one or more antennas; a video encoder configured to encode video data into a parallel plurality of encoded video streams, the parallel plurality of encoded video streams comprising the video data encoded according to a respective plurality of different video bitrates; a selector configured to select, based on one or more parameters corresponding to a condition of a wireless communication link, a selected encoded video stream from the parallel plurality of encoded video streams; and a radio to transmit the selected encoded video stream over the wireless communication link.

Example 15 includes the subject matter of Example 14, and optionally, wherein the one or more parameters comprise at least one parameter corresponding to a link capacity of the wireless communication link.

Example 16 includes the subject matter of Example 15, and optionally, wherein the selector is configured to select a first encoded video stream having a first video bitrate for a first link capacity of the wireless communication link, and to select a second encoded video stream having a second video bitrate for a second link capacity of the wireless communication link, the first video bitrate is greater than the second video bitrate, the first link capacity is greater than the second link capacity.

Example 17 includes the subject matter of any one of Examples 14-16, and optionally, wherein the selector is configured to select the selected encoded video stream based on a link capacity indication from the radio.

Example 18 includes the subject matter of any one of Examples 14-17, and optionally, wherein the selector is configured to, during transmission of a video frame, select a first selected encoded video stream for transmission of a first portion of the video frame, and switch to a second selected video stream for transmission of a second portion of the video frame.

Example 19 includes the subject matter of any one of Examples 14-18, and optionally, wherein the video encoder is configured to generate bitstream information corresponding to the parallel plurality of encoded video streams, bitstream information corresponding to an encoded video stream of the parallel plurality of encoded video streams comprises at least one of an indication of a video frame, or an indication of a video bitrate of the encoded video stream.

Example 20 includes the subject matter of Example 19, and optionally, wherein the bitstream information corresponding to the encoded video stream comprises at least an indication of a portion of the video frame.

Example 21 includes the subject matter of Example 19 or 20, and optionally, wherein the video encoder is configured to generate the bitstream information corresponding to the encoded video stream in the form of metadata appended to the encoded video stream.

Example 22 includes the subject matter of any one of Examples 14-21, and optionally, comprising a controller to cause the video encoder to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 23 includes the subject matter of Example 22, and optionally, wherein the controller is configured to determine the configuration of the parallel plurality of encoded video streams based on at least one of a power state of a video source comprising the video encoder, or a movement state of the video source.

Example 24 includes the subject matter of Example 22 or 23, and optionally, wherein the radio is configured to receive state information from a video sink, which is to receive the video data, the controller configured to determine the configuration of the parallel plurality of encoded video streams based on the state information from the video sink.

Example 25 includes the subject matter of Example 24, and optionally, wherein the state information comprises at least one of a power state indication to indicate a power state of the video sink, or a movement indication to indicate a movement state of the video sink.

Example 26 includes a method to be performed at a wireless communication station (STA), the method comprising encoding video data into a parallel plurality of encoded video streams, the parallel plurality of encoded video streams comprising the video data encoded according to a respective plurality of different video bitrates; selecting, based on one or more parameters corresponding to a condition of a wireless communication link, a selected encoded video stream from the parallel plurality of encoded video streams; and transmitting the selected encoded video stream over the wireless communication link.

Example 27 includes the subject matter of Example 26, and optionally, wherein the one or more parameters comprise at least one parameter corresponding to a link capacity of the wireless communication link.

Example 28 includes the subject matter of Example 27, and optionally, comprising selecting a first encoded video stream having a first video bitrate for a first link capacity of the wireless communication link, and selecting a second encoded video stream having a second video bitrate for a second link capacity of the wireless communication link, the first video bitrate is greater than the second video bitrate, the first link capacity is greater than the second link capacity.

Example 29 includes the subject matter of any one of Examples 26-28, and optionally, comprising selecting the selected encoded video stream based on a link capacity indication from the STA.

Example 30 includes the subject matter of any one of Examples 26-29, and optionally, comprising, during transmission of a video frame, selecting a first selected encoded video stream for transmission of a first portion of the video frame, and switching to a second selected video stream for transmission of a second portion of the video frame.

Example 31 includes the subject matter of any one of Examples 26-30, and optionally, comprising generating bitstream information corresponding to the parallel plurality of encoded video streams, bitstream information corresponding to an encoded video stream of the parallel plurality of encoded video streams comprises at least one of an indication of a video frame, or an indication of a video bitrate of the encoded video stream.

Example 32 includes the subject matter of Example 31, and optionally, wherein the bitstream information corresponding to the encoded video stream comprises at least an indication of a portion of the video frame.

Example 33 includes the subject matter of Example 31 or 32, and optionally, comprising generating the bitstream information corresponding to the encoded video stream in the form of metadata appended to the encoded video stream.

Example 34 includes the subject matter of any one of Examples 26-33, and optionally, comprising adjusting a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 35 includes the subject matter of Example 34, and optionally, comprising determining the configuration of the parallel plurality of encoded video streams based on at least one of a power state of a video source, or a movement state of the video source.

Example 36 includes the subject matter of Example 34 or 35, and optionally, comprising receiving state information from a video sink, which is to receive the video data, and determining the configuration of the parallel plurality of encoded video streams based on the state information from the video sink.

Example 37 includes the subject matter of Example 36, and optionally, wherein the state information comprises at least one of a power state indication to indicate a power state of the video sink, or a movement indication to indicate a movement state of the video sink.

Example 38 includes a product comprising one or more tangible computer-readable non-transitory storage media comprising computer-executable instructions operable to, when executed by at least one processor, enable the at least one processor to cause a wireless communication station (STA) to encode video data into a parallel plurality of encoded video streams, the parallel plurality of encoded video streams comprising the video data encoded according to a respective plurality of different video bitrates; select, based on one or more parameters corresponding to a condition of a wireless communication link, a selected encoded video stream from the parallel plurality of encoded video streams; and transmit the selected encoded video stream over the wireless communication link.

Example 39 includes the subject matter of Example 38, and optionally, wherein the one or more parameters comprise at least one parameter corresponding to a link capacity of the wireless communication link.

Example 40 includes the subject matter of Example 39, and optionally, wherein the instructions, when executed, cause the STA to select a first encoded video stream having a first video bitrate for a first link capacity of the wireless communication link, and to select a second encoded video stream having a second video bitrate for a second link capacity of the wireless communication link, the first video bitrate is greater than the second video bitrate, the first link capacity is greater than the second link capacity.

Example 41 includes the subject matter of any one of Examples 38-40, and optionally, wherein the instructions, when executed, cause the STA to select the selected encoded video stream based on a link capacity indication from the STA.

Example 42 includes the subject matter of any one of Examples 38-41, and optionally, wherein the instructions, when executed, cause the STA to, during transmission of a video frame, select a first selected encoded video stream for transmission of a first portion of the video frame, and switch to a second selected video stream for transmission of a second portion of the video frame.

Example 43 includes the subject matter of any one of Examples 38-42, and optionally, wherein the instructions, when executed, cause the STA to generate bitstream information corresponding to the parallel plurality of encoded video streams, bitstream information corresponding to an encoded video stream of the parallel plurality of encoded video streams comprises at least one of an indication of a video frame, or an indication of a video bitrate of the encoded video stream.

Example 44 includes the subject matter of Example 43, and optionally, wherein the bitstream information corresponding to the encoded video stream comprises at least an indication of a portion of the video frame.

Example 45 includes the subject matter of Example 43 or 44, and optionally, wherein the instructions, when executed, cause the STA to generate the bitstream information corresponding to the encoded video stream in the form of metadata appended to the encoded video stream.

Example 46 includes the subject matter of any one of Examples 38-45, and optionally, wherein the instructions, when executed, cause the STA to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 47 includes the subject matter of Example 46, and optionally, wherein the instructions, when executed, cause the STA to determine the configuration of the parallel plurality of encoded video streams based on at least one of a power state of a video source, or a movement state of the video source.

Example 48 includes the subject matter of Example 46 or 47, and optionally, wherein the instructions, when executed, cause the STA to receive state information from a video sink, which is to receive the video data, the instructions, when executed, cause the STA to determine the configuration of the parallel plurality of encoded video streams based on the state information from the video sink.

Example 49 includes the subject matter of Example 48, and optionally, wherein the state information comprises at least one of a power state indication to indicate a power state of the video sink, or a movement indication to indicate a movement state of the video sink.

Example 50 includes an apparatus of wireless communication by a wireless communication station (STA), the apparatus comprising means for encoding video data into a parallel plurality of encoded video streams, the parallel plurality of encoded video streams comprising the video data encoded according to a respective plurality of different video bitrates; means for selecting, based on one or more parameters corresponding to a condition of a wireless communication link, a selected encoded video stream from the parallel plurality of encoded video streams; and means for transmitting the selected encoded video stream over the wireless communication link.

Example 51 includes the subject matter of Example 50, and optionally, wherein the one or more parameters comprise at least one parameter corresponding to a link capacity of the wireless communication link.

Example 52 includes the subject matter of Example 51, and optionally, comprising means for selecting a first encoded video stream having a first video bitrate for a first link capacity of the wireless communication link, and selecting a second encoded video stream having a second video bitrate for a second link capacity of the wireless communication link, the first video bitrate is greater than the second video bitrate, the first link capacity is greater than the second link capacity.

Example 53 includes the subject matter of any one of Examples 50-52, and optionally, comprising means for selecting the selected encoded video stream based on a link capacity indication from the STA.

Example 54 includes the subject matter of any one of Examples 50-53, and optionally, comprising means for, during transmission of a video frame, selecting a first selected encoded video stream for transmission of a first portion of the video frame, and switching to a second selected video stream for transmission of a second portion of the video frame.

Example 55 includes the subject matter of any one of Examples 50-54, and optionally, comprising means for generating bitstream information corresponding to the parallel plurality of encoded video streams, bitstream information corresponding to an encoded video stream of the parallel plurality of encoded video streams comprises at least one of an indication of a video frame, or an indication of a video bitrate of the encoded video stream.

Example 56 includes the subject matter of Example 55, and optionally, wherein the bitstream information corresponding to the encoded video stream comprises at least an indication of a portion of the video frame.

Example 57 includes the subject matter of Example 55 or 56, and optionally, comprising means for generating the bitstream information corresponding to the encoded video stream in the form of metadata appended to the encoded video stream.

Example 58 includes the subject matter of any one of Examples 50-57, and optionally, comprising means for adjusting a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 59 includes the subject matter of Example 58, and optionally, comprising means for determining the configuration of the parallel plurality of encoded video streams based on at least one of a power state of a video source, or a movement state of the video source.

Example 60 includes the subject matter of Example 58 or 59, and optionally, comprising means for receiving state information from a video sink, which is to receive the video data, and determining the configuration of the parallel plurality of encoded video streams based on the state information from the video sink.

Example 61 includes the subject matter of Example 60, and optionally, wherein the state information comprises at least one of a power state indication to indicate a power state of the video sink, or a movement indication to indicate a movement state of the video sink.

Example 62 includes an apparatus comprising logic and circuitry to cause a wireless communication station (STA) to dynamically select a selected video stream from a parallel plurality of encoded video streams comprising video data encoded according to a respective plurality of different video bitrates, dynamically selecting the selected video stream comprising selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream comprising the video data encoded according to a first video bitrate, the second encoded video stream comprising the video data encoded according to a second video bitrate different from the first video bitrate; and transmit the selected encoded video stream over the wireless communication link.

Example 63 includes the subject matter of Example 62, and optionally, wherein the at least one parameter corresponding to the condition of the wireless communication link comprises at least one parameter corresponding to a link capacity of the wireless communication link.

Example 64 includes the subject matter of Example 62 or 63, and optionally, wherein the first video bitrate corresponds to a first link capacity of the wireless communication link, the second video bitrate corresponds to a second link capacity of the wireless communication link, the first video bitrate is greater than the second video bitrate, the first link capacity is greater than the second link capacity.

Example 65 includes the subject matter of any one of Examples 62-64, and optionally, wherein an encoded video stream of the parallel plurality of encoded video streams comprises bitstream information corresponding to the encoded video stream, the bitstream information corresponding to the encoded video stream comprises at least one of an indication of a video frame, or an indication of a video bitrate of the encoded video stream.

Example 66 includes the subject matter of Example 65, and optionally, wherein the bitstream information corresponding to the encoded video stream comprises at least an indication of a portion of the video frame.

Example 67 includes the subject matter of Example 65 or 66, and optionally, wherein the bitstream information corresponding to the encoded video stream comprises metadata appended to the encoded video stream.

Example 68 includes the subject matter of any one of Examples 62-67, and optionally, wherein the apparatus is configured to cause the STA to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 69 includes the subject matter of Example 68, and optionally, wherein the apparatus is configured to cause the STA to determine the configuration of the parallel plurality of encoded video streams based on at least one of a power state of a video source, or a movement state of the video source.

Example 70 includes the subject matter of Example 68 or 69, and optionally, wherein the apparatus is configured to cause the STA to determine the configuration of the parallel plurality of encoded video streams based on state information from a video sink, which is to receive the video data.

Example 71 includes the subject matter of Example 70, and optionally, wherein the state information comprises at least one of a power state indication to indicate a power state of the video sink, or a movement indication to indicate a movement state of the video sink.

Example 72 includes the subject matter of any one of Examples 62-71, and optionally, wherein the first encoded video stream comprises encoded video data of a first portion of a video frame, and the second encoded video stream comprises encoded video data of a second portion of the video frame.

Example 73 includes the subject matter of any one of Examples 62-72, and optionally, comprising a processor, a memory, and one or more antennas.

Example 74 includes a system of wireless communication comprising a wireless communication station (STA), the STA comprising one or more antennas; a radio; a memory; a processor; and a controller configured to cause the STA to dynamically select a selected video stream from a parallel plurality of encoded video streams comprising video data encoded according to a respective plurality of different video bitrates, dynamically selecting the selected video stream comprising selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream comprising the video data encoded according to a first video bitrate, the second encoded video stream comprising the video data encoded according to a second video bitrate different from the first video bitrate; and transmit the selected encoded video stream over the wireless communication link.

Example 75 includes the subject matter of Example 74, and optionally, wherein the at least one parameter corresponding to the condition of the wireless communication link comprises at least one parameter corresponding to a link capacity of the wireless communication link.

Example 76 includes the subject matter of Example 74 or 75, and optionally, wherein the first video bitrate corresponds to a first link capacity of the wireless communication link, the second video bitrate corresponds to a second link capacity of the wireless communication link, the first video bitrate is greater than the second video bitrate, the first link capacity is greater than the second link capacity.

Example 77 includes the subject matter of any one of Examples 74-76, and optionally, wherein an encoded video stream of the parallel plurality of encoded video streams comprises bitstream information corresponding to the encoded video stream, the bitstream information corresponding to the encoded video stream comprises at least one of an indication of a video frame, or an indication of a video bitrate of the encoded video stream.

Example 78 includes the subject matter of Example 77, and optionally, wherein the bitstream information corresponding to the encoded video stream comprises at least an indication of a portion of the video frame.

Example 79 includes the subject matter of Example 77 or 78, and optionally, wherein the bitstream information corresponding to the encoded video stream comprises metadata appended to the encoded video stream.

Example 80 includes the subject matter of any one of Examples 74-79, and optionally, wherein the controller is configured to cause the STA to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 81 includes the subject matter of Example 80, and optionally, wherein the controller is configured to cause the STA to determine the configuration of the parallel plurality of encoded video streams based on at least one of a power state of a video source, or a movement state of the video source.

Example 82 includes the subject matter of Example 80 or 81, and optionally, wherein the controller is configured to cause the STA to determine the configuration of the parallel plurality of encoded video streams based on state information from a video sink, which is to receive the video data.

Example 83 includes the subject matter of Example 82, and optionally, wherein the state information comprises at least one of a power state indication to indicate a power state of the video sink, or a movement indication to indicate a movement state of the video sink.

Example 84 includes the subject matter of any one of Examples 74-83, and optionally, wherein the first encoded video stream comprises encoded video data of a first portion of a video frame, and the second encoded video stream comprises encoded video data of a second portion of the video frame.

Example 85 includes a method to be performed at a wireless communication station (STA), the method comprising dynamically selecting a selected video stream from a parallel plurality of encoded video streams comprising video data encoded according to a respective plurality of different video bitrates, dynamically selecting the selected video stream comprising selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream comprising the video data encoded according to a first video bitrate, the second encoded video stream comprising the video data encoded according to a second video bitrate different from the first video bitrate; and transmitting the selected encoded video stream over the wireless communication link.

Example 86 includes the subject matter of Example 85, and optionally, wherein the at least one parameter corresponding to the condition of the wireless communication link comprises at least one parameter corresponding to a link capacity of the wireless communication link.

Example 87 includes the subject matter of Example 85 or 86, and optionally, wherein the first video bitrate corresponds to a first link capacity of the wireless communication link, the second video bitrate corresponds to a second link capacity of the wireless communication link, the first video bitrate is greater than the second video bitrate, the first link capacity is greater than the second link capacity.

Example 88 includes the subject matter of any one of Examples 85-87, and optionally, wherein an encoded video stream of the parallel plurality of encoded video streams comprises bitstream information corresponding to the encoded video stream, the bitstream information corresponding to the encoded video stream comprises at least one of an indication of a video frame, or an indication of a video bitrate of the encoded video stream.

Example 89 includes the subject matter of Example 88, and optionally, wherein the bitstream information corresponding to the encoded video stream comprises at least an indication of a portion of the video frame.

Example 90 includes the subject matter of Example 88 or 89, and optionally, wherein the bitstream information corresponding to the encoded video stream comprises metadata appended to the encoded video stream.

Example 91 includes the subject matter of any one of Examples 85-90, and optionally, comprising adjusting a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 92 includes the subject matter of Example 91, and optionally, comprising determining the configuration of the parallel plurality of encoded video streams based on at least one of a power state of a video source, or a movement state of the video source.

Example 93 includes the subject matter of Example 91 or 92, and optionally, comprising determining the configuration of the parallel plurality of encoded video streams based on state information from a video sink, which is to receive the video data.

Example 94 includes the subject matter of Example 93, and optionally, wherein the state information comprises at least one of a power state indication to indicate a power state of the video sink, or a movement indication to indicate a movement state of the video sink.

Example 95 includes the subject matter of any one of Examples 85-94, and optionally, wherein the first encoded video stream comprises encoded video data of a first portion of a video frame, and the second encoded video stream comprises encoded video data of a second portion of the video frame.

Example 96 includes a product comprising one or more tangible computer-readable non-transitory storage media comprising computer-executable instructions operable to, when executed by at least one processor, enable the at least one processor to cause a wireless communication station (STA) to dynamically select a selected video stream from a parallel plurality of encoded video streams comprising video data encoded according to a respective plurality of different video bitrates, dynamically selecting the selected video stream comprising selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream comprising the video data encoded according to a first video bitrate, the second encoded video stream comprising the video data encoded according to a second video bitrate different from the first video bitrate; and transmit the selected encoded video stream over the wireless communication link.

Example 97 includes the subject matter of Example 96, and optionally, wherein the at least one parameter corresponding to the condition of the wireless communication link comprises at least one parameter corresponding to a link capacity of the wireless communication link.

Example 98 includes the subject matter of Example 96 or 97, and optionally, wherein the first video bitrate corresponds to a first link capacity of the wireless communication link, the second video bitrate corresponds to a second link capacity of the wireless communication link, the first video bitrate is greater than the second video bitrate, the first link capacity is greater than the second link capacity.

Example 99 includes the subject matter of any one of Examples 96-98, and optionally, wherein an encoded video stream of the parallel plurality of encoded video streams comprises bitstream information corresponding to the encoded video stream, the bitstream information corresponding to the encoded video stream comprises at least one of an indication of a video frame, or an indication of a video bitrate of the encoded video stream.

Example 100 includes the subject matter of Example 99, and optionally, wherein the bitstream information corresponding to the encoded video stream comprises at least an indication of a portion of the video frame.

Example 101 includes the subject matter of Example 99 or 100, and optionally, wherein the bitstream information corresponding to the encoded video stream comprises metadata appended to the encoded video stream.

Example 102 includes the subject matter of any one of Examples 96-101, and optionally, wherein the instructions, when executed, cause the STA to adjust a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 103 includes the subject matter of Example 102, and optionally, wherein the instructions, when executed, cause the STA to determine the configuration of the parallel plurality of encoded video streams based on at least one of a power state of a video source, or a movement state of the video source.

Example 104 includes the subject matter of Example 102 or 103, and optionally, wherein the instructions, when executed, cause the STA to determine the configuration of the parallel plurality of encoded video streams based on state information from a video sink, which is to receive the video data.

Example 105 includes the subject matter of Example 104, and optionally, wherein the state information comprises at least one of a power state indication to indicate a power state of the video sink, or a movement indication to indicate a movement state of the video sink.

Example 106 includes the subject matter of any one of Examples 96-105, and optionally, wherein the first encoded video stream comprises encoded video data of a first portion of a video frame, and the second encoded video stream comprises encoded video data of a second portion of the video frame.

Example 107 includes an apparatus of wireless communication by a wireless communication station (STA), the apparatus comprising means for dynamically selecting a selected video stream from a parallel plurality of encoded video streams comprising video data encoded according to a respective plurality of different video bitrates, dynamically selecting the selected video stream comprising selecting, based on a value of at least one parameter corresponding to a condition of a wireless communication link, a first encoded video stream from the parallel plurality of encoded video streams, and, based on a change in the value of the at least one parameter, selecting a second encoded video stream from the parallel plurality of encoded video streams, the first encoded video stream comprising the video data encoded according to a first video bitrate, the second encoded video stream comprising the video data encoded according to a second video bitrate different from the first video bitrate; and means for transmitting the selected encoded video stream over the wireless communication link.

Example 108 includes the subject matter of Example 107, and optionally, wherein the at least one parameter corresponding to the condition of the wireless communication link comprises at least one parameter corresponding to a link capacity of the wireless communication link.

Example 109 includes the subject matter of Example 107 or 108, and optionally, wherein the first video bitrate corresponds to a first link capacity of the wireless communication link, the second video bitrate corresponds to a second link capacity of the wireless communication link, the first video bitrate is greater than the second video bitrate, the first link capacity is greater than the second link capacity.

Example 110 includes the subject matter of any one of Examples 107-109, and optionally, wherein an encoded video stream of the parallel plurality of encoded video streams comprises bitstream information corresponding to the encoded video stream, the bitstream information corresponding to the encoded video stream comprises at least one of an indication of a video frame, or an indication of a video bitrate of the encoded video stream.

Example 111 includes the subject matter of Example 110, and optionally, wherein the bitstream information corresponding to the encoded video stream comprises at least an indication of a portion of the video frame.

Example 112 includes the subject matter of Example 110 or 111, and optionally, wherein the bitstream information corresponding to the encoded video stream comprises metadata appended to the encoded video stream.

Example 113 includes the subject matter of any one of Examples 107-112, and optionally, comprising means for adjusting a configuration of the parallel plurality of encoded video streams, the configuration of the parallel plurality of encoded video streams comprises at least one of a count of the parallel plurality of encoded video streams, or the plurality of different video bitrates of the parallel plurality of encoded video streams.

Example 114 includes the subject matter of Example 113, and optionally, comprising means for determining the configuration of the parallel plurality of encoded video streams based on at least one of a power state of a video source, or a movement state of the video source.

Example 115 includes the subject matter of Example 113 or 114, and optionally, comprising means for determining the configuration of the parallel plurality of encoded video streams based on state information from a video sink, which is to receive the video data.

Example 116 includes the subject matter of Example 115, and optionally, wherein the state information comprises at least one of a power state indication to indicate a power state of the video sink, or a movement indication to indicate a movement state of the video sink.

Example 117 includes the subject matter of any one of Examples 107-116, and optionally, wherein the first encoded video stream comprises encoded video data of a first portion of a video frame, and the second encoded video stream comprises encoded video data of a second portion of the video frame.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a video encoder configured to encode video data into a plurality of encoded video streams in parallel, the plurality of encoded video streams comprising the video data encoded according to a respective plurality of different video bitrates;
a selector configured to identify one or more parameters corresponding to a condition of a wireless communication link, and, based on the one or more parameters to select a selected encoded video stream from the plurality of encoded video streams; and
a radio to transmit the selected encoded video stream over the wireless communication link,
wherein the selector is configured to, during transmission of a video frame, select a first selected encoded video stream for transmission of a first portion of the video frame, and select a second encoded video stream for transmission of a second portion of the video frame.

2. The apparatus of claim 1, wherein the one or more parameters comprise at least one parameter corresponding to a link capacity of the wireless communication link.

3. The apparatus of claim 2, wherein the selector is configured to select a first encoded video stream having a first video bitrate for a first link capacity of the wireless communication link, and to select a second encoded video stream having a second video bitrate for a second link capacity of the wireless communication link, wherein the first video bitrate is greater than the second video bitrate, and wherein the first link capacity is greater than the second link capacity.

4. The apparatus of claim 1, wherein the selector is configured to select the selected encoded video stream based on a link capacity indication from the radio.

5. The apparatus of claim 1, wherein the video encoder is configured to generate bitstream information corresponding to the plurality of encoded video streams, wherein bitstream information corresponding to an encoded video stream of the plurality of encoded video streams comprises at least one of a video frame indication, or an indication of a video bitrate of the encoded video stream.

6. The apparatus of claim 5, wherein the bitstream information corresponding to the encoded video stream comprises at least an indication of a video frame portion.

7. The apparatus of claim 5, wherein the video encoder is configured to generate the bitstream information corresponding to the encoded video stream in the form of metadata appended to the encoded video stream.

8. The apparatus of claim 1 comprising a controller to cause the video encoder to adjust a configuration of the plurality of encoded video streams, wherein the configuration of the plurality of encoded video streams comprises at least one of a count of the plurality of encoded video streams, or the plurality of different video bitrates of the plurality of encoded video streams.

9. The apparatus of claim 8, wherein the controller is configured to determine the configuration of the plurality of encoded video streams based on at least one of a power state of a video source comprising the video encoder, or a movement state of the video source.

10. The apparatus of claim 8, wherein the radio is configured to receive state information from a video sink for receiving the video data, the controller configured to determine the configuration of the plurality of encoded video streams based on the state information from the video sink.

11. The apparatus of claim 10, wherein the state information comprises at least one of a power state indication to indicate a power state of the video sink, or a movement indication to indicate a movement state of the video sink.

12. The apparatus of claim 1 comprising a processor, a memory, and one or more antennas connected to the radio.

13. A product comprising one or more tangible computer-readable non-transitory storage media comprising computer-executable instructions operable to, when executed by at least one processor, enable the at least one processor to cause a wireless communication station (STA) to:
encode video data into a plurality of encoded video streams in parallel, the plurality of encoded video streams comprising the video data encoded according to a respective plurality of different video bitrates;
identify one or more parameters corresponding to a condition of a wireless communication link;
based on the one or more parameters, select a selected encoded video stream from the plurality of encoded video streams; and
transmit the selected encoded video stream over the wireless communication link,
wherein the instructions, when executed, cause the STA to, during transmission of a video frame, select a first selected encoded video stream for transmission of a first portion of the video frame, and select a second encoded video stream for transmission of a second portion of the video frame.

14. The product of claim 13, wherein the one or more parameters comprise at least one parameter corresponding to a link capacity of the wireless communication link.

15. The product of claim 13, wherein the instructions, when executed, cause the STA to adjust a configuration of the plurality of encoded video streams, wherein the configuration of the plurality of encoded video streams comprises at least one of a count of the plurality of encoded video streams, or the plurality of different video bitrates of the plurality of encoded video streams.

16. The product of claim 13, wherein the instructions, when executed, cause the STA to generate bitstream information corresponding to the plurality of encoded video streams, wherein bitstream information corresponding to an encoded video stream of the plurality of encoded video streams comprises at least one of an indication of a video frame, or an indication of a video bitrate of the encoded video stream.

17. An apparatus comprising logic and circuitry configured to cause a wireless communication station (STA) to:
dynamically select a selected video stream from a plurality of encoded video streams comprising video data encoded in parallel according to a respective plurality of different video bitrates, wherein dynamically selecting the selected video stream comprises:
identifying a value of at least one parameter corresponding to a condition of a wireless communication link;
selecting, based on the value of the at least one parameter, a first encoded video stream from the plurality of encoded video streams; and
based on an identified change in the value of the at least one parameter, selecting a second encoded video stream from the plurality of encoded video streams, wherein the first encoded video stream comprises the video data encoded according to a first video bitrate, and wherein the second encoded video stream comprises the video data encoded according to a second video bitrate different from the first video bitrate, wherein the first encoded video stream comprises encoded video data of a first portion of a video frame, and the second encoded video stream comprises encoded video data of a second portion of the video frame; and
transmit the selected encoded video stream over the wireless communication link.

18. The apparatus of claim 17, wherein the at least one parameter corresponding to the condition of the wireless communication link comprises at least one parameter corresponding to a link capacity of the wireless communication link.

19. The apparatus of claim 17, wherein the first video bitrate corresponds to a first link capacity of the wireless communication link, the second video bitrate corresponds to a second link capacity of the wireless communication link, wherein the first video bitrate is greater than the second video bitrate, and wherein the first link capacity is greater than the second link capacity.

20. The apparatus of claim 17, wherein an encoded video stream of the plurality of encoded video streams comprises bitstream information corresponding to the encoded video stream, wherein the bitstream information corresponding to the encoded video stream comprises at least one of an indication of a video frame, or an indication of a video bitrate of the encoded video stream.

21. The apparatus of claim 17 configured to cause the STA to adjust a configuration of the plurality of encoded video streams, wherein the configuration of the plurality of encoded video streams comprises at least one of a count of the plurality of encoded video streams, or the plurality of different video bitrates of the plurality of encoded video streams.

22. An apparatus of wireless communication by a wireless communication station (STA), the apparatus comprising:
  means for dynamically selecting a selected video stream from a plurality of encoded video streams comprising video data encoded in parallel according to a respective plurality of different video bitrates, wherein dynamically selecting the selected video stream comprises:
    identifying a value of at least one parameter corresponding to a condition of a wireless communication link;
    selecting, based on the value of the at least one parameter, a first encoded video stream from the plurality of encoded video streams; and
    based on an identified change in the value of the at least one parameter, selecting a second encoded video stream from the plurality of encoded video streams, wherein the first encoded video stream comprises the video data encoded according to a first video bitrate, and wherein the second encoded video stream comprises the video data encoded according to a second video bitrate different from the first video bitrate, wherein the first encoded video stream comprises encoded video data of a first portion of a video frame, and the second encoded video stream comprises encoded video data of a second portion of the video frame; and
  means for causing the STA to transmit the selected encoded video stream over the wireless communication link.

23. The apparatus of claim 22, wherein the at least one parameter corresponding to the condition of the wireless communication link comprises at least one parameter corresponding to a link capacity of the wireless communication link.

* * * * *

UNITED STATES PATENT AND TRADEMARK OFFICE
CERTIFICATE OF CORRECTION

| | |
|---|---|
| PATENT NO. | : 11,683,550 B2 |
| APPLICATION NO. | : 16/639843 |
| DATED | : June 20, 2023 |
| INVENTOR(S) | : Yaniv Frishman et al. |

It is certified that error appears in the above-identified patent and that said Letters Patent is hereby corrected as shown below:

In the Claims

In Column 36, Line 67, in Claim 1, delete "the one or more para meters" and insert -- the one or more parameters --, therefor Signed and Sealed this
Twenty-ninth Day of August, 2023

*Katherine Kelly Vidal*

Katherine Kelly Vidal
*Director of the United States Patent and Trademark Office*